US005571974A

United States Patent [19]

Nauful

[11] Patent Number: 5,571,974
[45] Date of Patent: Nov. 5, 1996

[54] METHOD AND APPARATUS FOR THE MEASUREMENT OF PARTICLE FLOW IN A PIPE

[76] Inventor: Eli S. Nauful, 104 Spring Water Dr., Columbia, S.C. 29223

[21] Appl. No.: 369,670

[22] Filed: Jan. 6, 1995

[51] Int. Cl.$^6$ ............................................. G01F 1/66
[52] U.S. Cl. ................................ 73/861.27; 73/861.04; 73/861.73
[58] Field of Search ...................... 73/861.04, 861.18, 73/861.25, 861.26, 861.27, 861.29, 861.35, 861.73, DIG. 4, 587, 592, 64.53, 61.75, 61.79

[56] References Cited

U.S. PATENT DOCUMENTS

| | | | |
|---|---|---|---|
| 3,580,092 | 5/1971 | Scarpa | 73/194 |
| 3,636,763 | 1/1972 | Beck | 73/194 |
| 3,906,780 | 9/1975 | Baldwin | 73/61.75 |
| 3,958,458 | 5/1976 | Foreman et al. | 73/194 |
| 4,261,196 | 4/1981 | Scheid, Jr. | 73/32 |
| 4,297,872 | 11/1981 | Ikeda et al. | 73/32 A |
| 4,373,401 | 2/1983 | Bavmdel | 73/861.18 |
| 4,598,593 | 7/1986 | Sheen et al. | 73/861.04 |
| 4,607,254 | 4/1986 | Carlson | 340/606 |
| 4,663,977 | 5/1987 | Vander Heyden | 73/861.27 |
| 5,012,449 | 4/1991 | Todd | 367/89 |
| 5,148,405 | 9/1992 | Belchamber et al. | 367/13 |
| 5,218,871 | 6/1993 | Cody et al. | 73/861.04 |
| 5,228,347 | 7/1993 | Lowell et al. | 73/861.27 |
| 5,357,811 | 10/1994 | Hoang | 73/861.38 |

Primary Examiner—Richard Chilcot
Assistant Examiner—Max H. Noori

[57] ABSTRACT

A system to measure the flow of coal using externally mounted vibration sensors. One or more vibration sensors are located on a pipe section which is not impacted by coal particles in the flow stream. This sensor measures the ambient pipe vibration. An equal number of vibration sensors is located on a pipe section impacted by the coal particles in the flow stream which will measure the ambient pipe vibrations plus the coal particle impact vibrations. The two vibration outputs from the sensors are combined to develop a coal or particle flow signal.

18 Claims, 2 Drawing Sheets

METHOD AND APPARATUS FOR THE MEASUREMENT OF PARTICLE FLOW IN A PIPE

FIELD OF THE INVENTION

The present invention relates generally to particle flow measurements and more particularly to a method and apparatus to measure the flow of particles in a pipe, especially coal conveyed by air through a pipe to a boiler.

BACKGROUND OF THE INVENTION

Power plants fueled by pulverized coal have not had the capability to measure, in real time, the flow of coal to each of the burners in a boiler during normal operation. Current coal flow measurement is determined from tests called clean and dirty air tests. Plant personnel must use pipe penetrations to take these measurements. The objectives of these tests are to calibrate and balance the coal flow to each burner so the plant can operate more efficiently. These tests are done on a periodic schedule and are labor intensive and time consuming. Since direct coal flow measurements have not been possible to date, coal flow has not been used as a control variable. Rather, the amount of coal to the boiler has been indirectly controlled by controlling other variables, such as pressure and temperature, and feeding enough coal to the boiler to maintain these parameters within established setpoints.

The Clean Air Act Amendments of 1990 require all coal fired power plants to limit nitrous oxide emissions to prescribed levels by 1995 and 2000. Owners of these installations must install low nitrous oxide burners. The required new equipment will require more stringent control of the coal flow to the boiler to minimize nitrous oxides and unburned carbon. Unbalanced coal flow to the burners will cause uneven combustion and increase the formation of nitrous oxides. Violation of the emissions regulations will subject the owner of the infracting installation to severe financial penalties. Vendors of low nitrous oxide burners realize the benefits of balanced coal flow to the burners as a means to further reduce the formation of nitrous oxides. These vendors may be able to give significant improvement in nitrous oxide emission guarantees if real time burner balancing were possible.

There are currently no commercial on-line coal flow measurement devices available. One company is testing a microwave coal flow measurement instrument. The microwave measurement technique requires a modification in a section of the coal pipe so the signal can penetrate the pipe wall. This measurement technique also requires constant particle velocity in the pipe, a condition which exists in very few coal fired plants. This microwave measurement technique requires a uniform particle distribution and is not capable of measuring the flow of coal under "roping" conditions. Roping is defined as a closely bunched stream of coal particles that coagulate together in the coal pipe.

Several particle measurement flow meters have been proposed in oil and slurry pipes using acoustic information. For example, one known measuring instrument uses an acoustic cross-correlation technique wherein two acoustic sensors are placed along a pipe section and acoustically decoupled by replacing a section of the pipe with pipe material incapable of transmitting an acoustic signal. The signals from the two acoustically isolated signals are cross correlated and a particle flow is calculated. The disadvantages of this measurement technique are troublesome. First, installation and operation of this instrument would require a modification to each pipe on which it is installed. The modifications necessary to install this equipment at just one power plant would have to be done to coal pipes ranging in number from sixteen (16) to over eighty (80), would be difficult and expensive, and would require a plant outage to make the necessary modifications. Second, an acoustic decoupler is very difficult to install on an eight (8) to twelve (12) inch diameter coal pipe made from carbon steel. It is almost impossible to envision a non-acoustic transmitting material that would also have the structural strength to support the carbon steel pipe interface while serving to decouple the acoustic signal.

Another known technique to measure the mass flow rate of particulate material conveyed hydrodynamically through a pipe by means of a flowing fluid of substantially constant mean velocity derives a flow signal by sensing variations in the capacitance of an electrode exposed to the flowing fluid or air. This method requires a penetration into the pipe or replacement of a section of the pipe with a new section containing the capacitance sensor. Its usefulness in coal burning plants is doubtful, because the velocity, size and quantity of coal particles transported in an air medium create a very abrasive condition under which most, if not all, of the sensors exposed to the particles will be destroyed. The air medium which carries the coal through the pipe in a plant has a variable particle velocity and not the constant mean velocity required by this method.

Another known technique proposes a flow sensor to detect changes in the mass flow per unit time of pneumatically conveyed particles within a system. The sensor is tuned to give an amplitude at a pre-selected mass flow and has as its primary objective the determination of the mass flow deviations from a singular, pre-selected mass flow. This method could not measure coal flow during the full range of plant operations during which the flow continually changes. The non-homogeneous flow characteristic of pneumatically conveyed coal flow and its complexity make this technique impractical in a coal fired plant.

There is a need for a particle flow measurement device capable of measuring directly the flow of coal particles through a pipe without extensive and/or invasive installation.

SUMMARY OF THE INVENTION

In accordance with its major aspects, the method and apparatus of the present invention comprise piezoelectric film sensors mounted on the inside and outside of a pipe bend. The sensor on the inside bend of the pipe is designated the ambient sensor because it will not be excited by the direct impingement of the coal particles while the sensor on the outside of the pipe bend, designated the active sensor, will pick up the impact vibrations from the coal particles hitting the pipe wall as the coal particles are conveyed by air to the boiler. The ambient sensor on the inside elbow of the pipe will sense some of the impact vibrations but these vibrations will be attenuated by its distance from the impact area. A standard vibration sensor may be used to measure the vibrations but, in some cases, it may not be sensitive enough to pick up the low level vibrations caused by low particle or coal flow.

Some features of the present invention are: the piezoelectric film transducer pickup may be sized to cover a large area of the pipe impacted by the particle flow; the piezoelectric film transducer voltage output is significantly larger than other accelerometers and gives a large output signal significantly improving the signal-to-noise ratio; the piezoelectric film transducer requires no pipe penetration; and the piezoelectric film transducer will operate at temperatures up to 170 degrees F. which can be the temperature of the coal pipe in the vicinity of the burners.

Another feature of the present invention is the piezoelectric sensors on the inside and outside elbows of a coal pipe can be connected out of phase so the resultant output signal will measure the differential vibration, that is, coal flow plus ambient vibration from the sensor on the outside elbow minus ambient vibration from the sensor on the inside elbow to give a net coal flow signal, after which the signal is buffered and input to a differential amplifier to eliminate ambient pipe and air vibrations during normal plant operation.

Yet another feature of the present invention is the ease of installation. No plant outage or modification to the coal pipes is necessary with the present invention.

One advantage of the present invention is its ability to determine absolute coal flow, relative coal flow and flow/no-flow conditions.

Another advantage of the coal flow measurement system of the present invention is that it will allow real time, on-line balancing of the burners in a coal fired boiler. This method does not require constant flow velocity and can measure coal flow over the full operating range and is unaffected by roping conditions. The method can operate over a full range of plant operation as the size, quantity and velocity of coal particles vary.

Another advantage of the present invention is the attachment method of the piezoelectric film transducers on the inside and outside walls of the pipe at a bend which gives a close coupling of the piezoelectric film sensor with the pipe wall.

The system will provide information to the operators to better control the combustion process while minimizing pollutants. The system will record and store the optimum plant parameters so that the operators will know, for the first time, the relative coal flow to the burners, providing the ability to repeat these optimal conditions when the plant changes load. The system will also provide information on trending or approach to unbalanced flow conditions or to pipe plugging.

BRIEF DESCRIPTION OF THE DRAWINGS

For a better understanding of the present invention, reference may be made to the accompanying drawings in which.

DETAILED DESCRIPTION OF THE PRESENTLY PREFERRED EMBODIMENT

Figure 1:
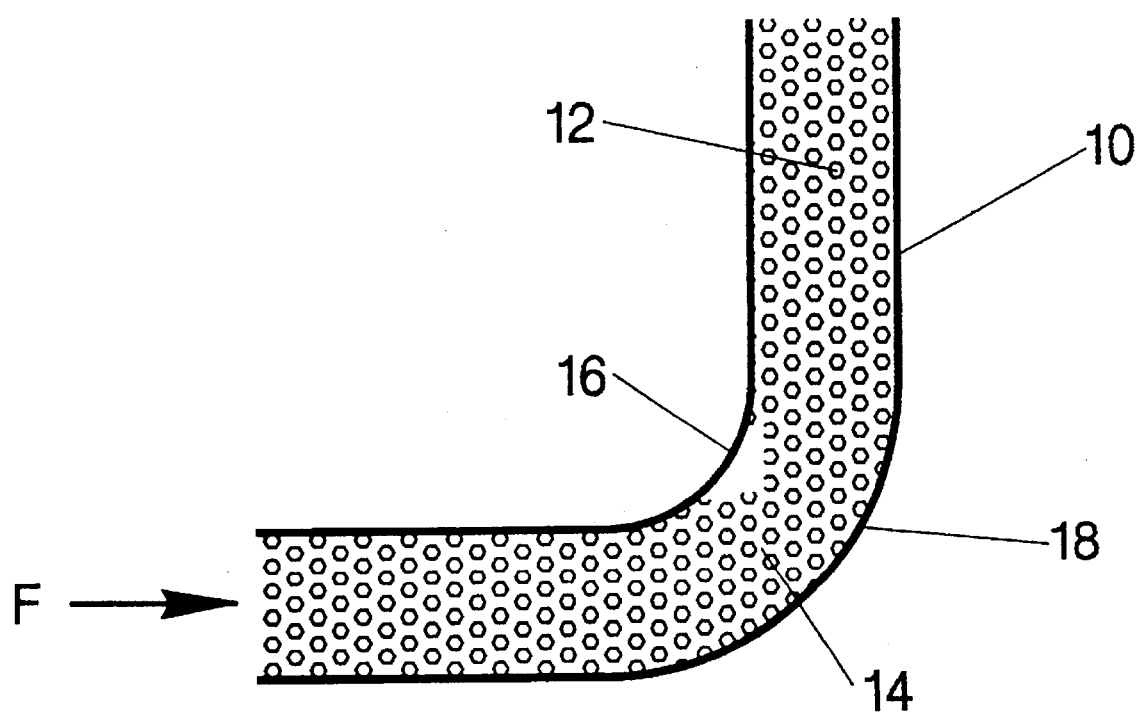
FIG. 1 is a cross sectional view of a typical coal pipe configuration at an elbow.

A typical application for which the present invention is eminently suited is the measurement of coal particle flow through a bent pipe. Referring first to FIG. 1, a typical coal pipe 10 is illustrated having coal particles 12 flowing therethrough in the direction of arrow F. A typical pipe bend 14 is shown with an inside elbow 16 and an outside elbow 18. Bend 14 may be slight, a few degrees, to approximately ninety (90) degrees.

Figure 2:
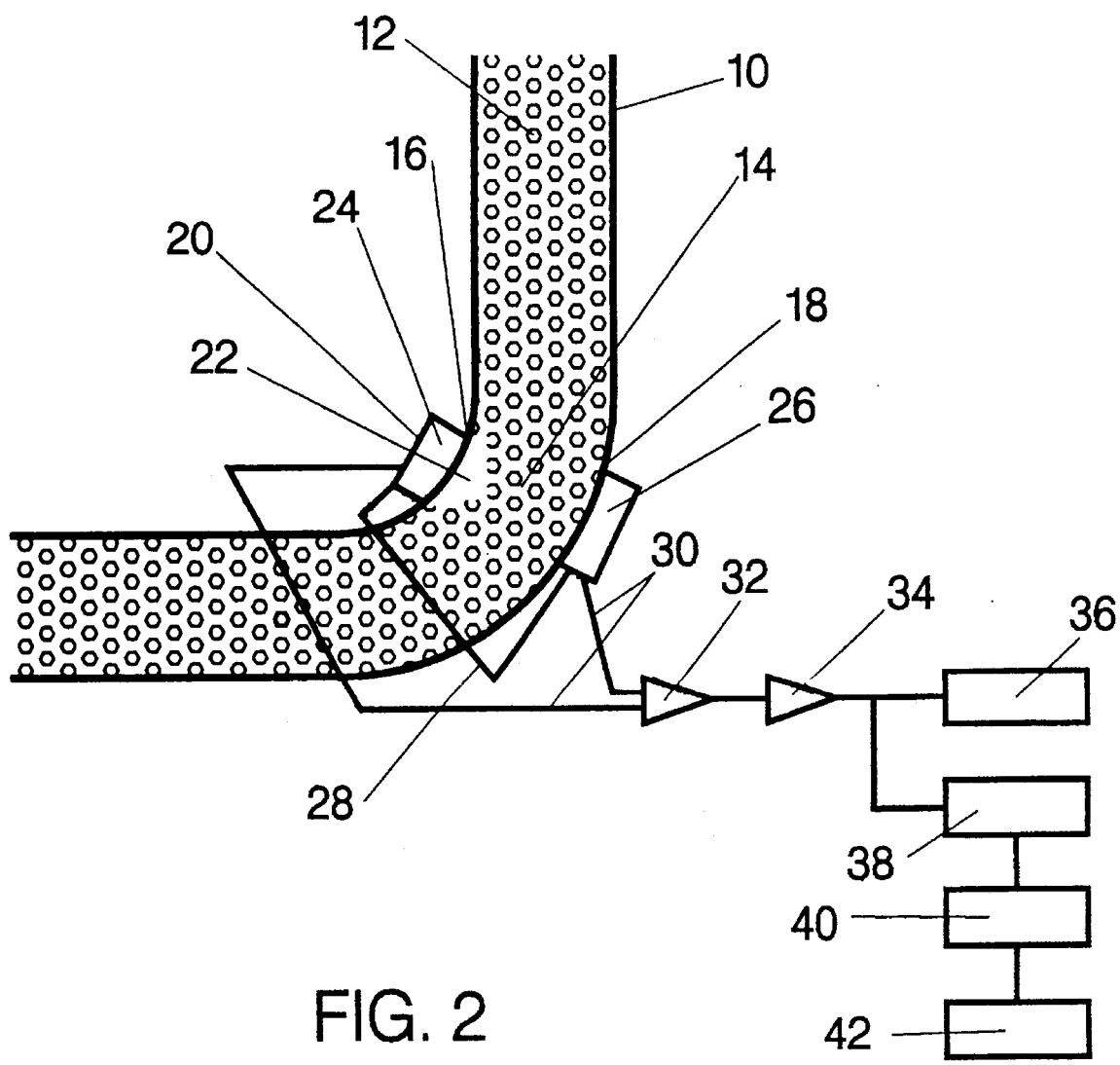
FIG. 2 is a cross sectional view as in FIG. 1 having the particle flow measurement apparatus mounted thereon.

A presently preferred embodiment of the apparatus of the present invention is illustrated by reference 20 in FIG. 2. Coal particles 12 are conveyed by hot air with a velocity typically ranging from 25 ft/sec to over 100 ft/sec. The coal flow is non-homogeneous and can often bunch together to form a rope. As coal particles 12 are transported through pipe 10 in the direction of arrow F and enter pipe bend 14 centrifugal force will cause coal particles 12 to impact the outside elbow 18 while creating a zone of no impact 22 at inside elbow 16. The two areas at inside elbow 16 and outside elbow 18 define the general location for placement of the ambient piezoelectric film sensor 24 and the active piezoelectric film sensor 26, respectively. Piezoelectric film sensors 24 and 26 and the connecting wire 28 are shielded to minimize electrical noise. The lead wire 30 from sensors 24 and 26 is also shielded to minimize noise pickup. Piezoelectric film sensors 24 and 26 are mounted on pipe 10 using high temperature epoxy to obtain a close coupling with the pipe material. As coal particles 12 hit outside elbow 18, it vibrates and these vibrations are sensed by active piezoelectric sensor 26. Coal particle to wall collisions do not occur on inside pipe elbow 16. Output signals generated by ambient sensor 24 and active sensor 26 are connected out of phase to develop a differential vibration signal. The resultant signal, coal flow, is buffered by buffer 32 and amplified by amplifier 34. The output of buffer 32 is input to amplifier 34 which will amplify the difference between the outputs of sensors 24 and 26. Under no-coal flow conditions amplifier 34 output is balanced to zero since both piezoelectric film sensors 24 and 26 will measure ambient plant vibrations with no coal flowing through pipe 10. As coal flow starts and increases to the boiler, the difference in the output of piezoelectric sensors 24 and 26 will continue to increase. The signal difference between sensors 24 and 26 as buffered by buffer 32 and amplified by amplifier 34 will be proportional to the coal flow to the boiler. The piezoelectric film sensors are sensitive to the infrared spectrum and are covered to eliminate the influence of this light wavelength. The output of the differential amplifier 34 is the coal flow signal and can be processed in several ways. The signals originating from piezoelectric film sensors 24 and 26 are transmitted to the signal conditioning, processing equipment and displays. The signal conditioning electronics comprising buffer 32 and amplifier 34 could be mounted as close as possible to sensors 24 and 26 and converted to a digital signal, optically isolated and transmitted using fiber optic cable to the processing equipment located in some remote area. The processing equipment comprises a digital display 36, an A/D converter 38, a computer 40, and an alarm 42.

The method of use of the present invention has three measurement capabilities to meet the needs to determine coal flow during the full range of operation. The first capability allows the plant operators to know when a coal pipe becomes plugged, stopping coal flow to the burner. The output of amplifier 34 will approach a small or zero output when this event occurs.

The second capability allows the balancing of the coal flow to the burners which requires that each channel of the coal flow measurement have the same relative output. This measurement capability will indicate relative coal flow information and will activate alarm 42 when the coal flow to any burner is outside of an established norm. A negative rate of change of the coal flow to any burner exceeding an established limit may signify an approach to a plugged pipe and allow the operator to take action to prevent plugging.

The third capability measures the quantity, size and velocity of the coal particles impacting the elbow and exciting the piezoelectric film sensor to provide a range of frequencies which can be correlated to mass coal flow. The operators may optimize the boiler at various loads and record the boiler coal flow and load to obtain the minimum unburned carbon and nitrous oxides. They may also record the coal flow measurement so that they may repeat these optimum conditions as the plant moves through its load range.

Accordingly, the coal flow system of the preferred embodiment of the present invention may be used to balance the flow of coal to the burners in a boiler and to determine the coal flow/no coal flow condition. The preferred embodiment of the present invention will enable utility boilers to further reduce pollutants to the environment to meet the requirements of the Clean Air Act of 1990.

Specific situations at various power plants have not been discussed, but it should be understood that the present invention may be adapted for those situations. For example, where the sensors are installed on elbows of different radii, the plant personnel will have to calibrate the system using current balancing techniques. However, once this is done, the particle flow system will be able to provide the real time balancing information. Also, the configuration of the piezoelectric film sensors can be designed to cover larger pipe areas or to have different configurations. Nonetheless, the basic system operation will not change, but, the system would give greater sensitivity and accuracy.

Although the preferred embodiment of the present invention has been discussed in the context of coal flow measurements, it can also be employed more generally for measurement of any pneumatically conveyed particles. The presently preferred embodiment of the present invention has been shown and described with a degree of particularity, but it should be understood that the scope of the invention is defined in the following claims.

What is claimed is:

1. A coal particle flow measuring apparatus for use on a bend in a pipe through which coal particles travel comprising:
   a plurality of piezoelectric film vibration sensors directly connected to the external walls of said pipe proximate to the bend, said sensors capable of generating vibrational signals reflecting the impingement of said particles with said walls and the impingement of said particles with each other as said particles flow through said pipe;
   means for developing differential vibration signals from said sensors for net cool flow signal; means for amplifying said differential vibration signals of said sensors; and means for processing said signals.

2. A particle flow measuring apparatus as in claim 1, wherein a first sensor is located on the outside portion of said bend in said pipe, sensing particle impingement on the wall of said bend as well as ambient particle-to-particle impingement; and a second sensor is located on the inside portion of said bend in said pipe and senses only ambient particle-to-particle impingement.

3. A particle flow measuring apparatus as in claim 1, wherein said differential vibration signal developing means comprises a first connection from said first sensor to said second sensor and a second connection from both said first and said second sensors to a buffering device.

4. A particle flow measuring apparatus as in claim 1, wherein said sensors are connected out of phase so as to develop said differential vibration signal.

5. A particle flow measuring apparatus as in claim 2, wherein said sensors are piezoelectric film sensors, and said sensors are connected out of phase so as to develop said differential vibration signal.

6. A particle flow measuring apparatus as in claim 1, wherein said processing means comprises a digital display, an analog to digital converter, and a computer.

7. A particle flow measuring apparatus as in claim 1, wherein said sensors are accelerometers.

8. A particle flow measuring apparatus as in claim 7, wherein said sensors are connected out of phase so as to develop said differential vibration signal.

9. A particle flow measuring apparatus as in claim 5, wherein said processing means comprises a digital display, an analog to digital converter, and a computer.

10. A method for measuring coal particle flow through a pipe having a bend therein comprising:
    connecting a plurality of piezoelectric film sensors directly to the external walls of said pipe proximate to the bend, said sensors developing differential vibration signals as said particles travel through said pipe for net cool flow signal;
    amplifying said differential vibration signals of said sensors;
    calibrating said differential vibration signals of said sensors; and
    processing said signals.

11. A method for measuring particle flow as in claim 10, wherein a first sensor is located on the outside portion of said bend in said pipe and senses particle impingement on the wall of said bend as well as ambient particle-to-particle impingement, and a second sensor is located on the inside portion of said bend in said pipe and senses only ambient particle-to-particle impingement.

12. A method for measuring particle flow as in claim 10, wherein said sensors are connected out of phase so as to develop said differential vibration signal.

13. A method for measuring particle flow as in claim 12, wherein said sensors are connected out of phase so as to develop said differential vibration signal.

14. A method for measuring particle flow as in claim 10, wherein said processing means comprises a digital display, an analog to digital converter, and a computer.

15. A method for measuring particle flow as in claim 11, wherein said calibrating determines a relative particle flow, a particle flow or no-flow condition, and a mass particle flow.

16. A method for measuring particle flow as in claim 15, wherein said relative particle flow is used to balance the flow to a boiler.

17. A method for measuring particle flow as in claim 15, wherein said relative particle flow is used to determine when the flow in said pipe becomes unbalanced or approaches a plugging condition.

18. A method for measuring particle flow as in claim 15, wherein said relative particle low is used to automatically control and balance the particle flow in a series of pipes.

* * * * *